United States Patent [19]

Striebich

[11] 4,411,135
[45] Oct. 25, 1983

[54] DRIVE UNIT, ESPECIALLY FOR MOTOR VEHICLES

[75] Inventor: Helmut Striebich, Karlsruhe, Fed. Rep. of Germany

[73] Assignee: Dr. Ing. h.c.F. Porsche AG, Stuttgart, Fed. Rep. of Germany

[21] Appl. No.: 256,618

[22] Filed: Apr. 22, 1981

[30] Foreign Application Priority Data

Apr. 26, 1980 [DE] Fed. Rep. of Germany ....... 3016228

[51] Int. Cl.³ .......................... F01K 23/10; F02C 1/04
[52] U.S. Cl. ......................................... 60/616; 415/90; 416/4
[58] Field of Search ............. 60/616; 415/90, DIG. 4; 416/4, 111

[56] References Cited

U.S. PATENT DOCUMENTS 1,661,940  3/1928  Green ..................................... 415/90
4,294,074 10/1981  Striebich ............................... 60/616

FOREIGN PATENT DOCUMENTS 936949 12/1955  Fed. Rep. of Germany ...... 416/111

*Primary Examiner*—Michael Koczo
*Attorney, Agent, or Firm*—Craig & Burns

[57] ABSTRACT

A drive unit of the type that includes an internal combustion engine and a waste-heat turbine unit that has a compressor, a secondary turbine, and an exhaust-gas turbine with hollow blades, within which the kinetic and heat energy of the exhaust gases are utilized in a superimposed work process is improved by forming the blades as pipes of at least an approximately circular cross section increases the degree of efficiency by better utilization of the kinetic energy of the exhaust gases in the exhaust-gas turbine by increasing the difference between the entering and exiting speeds thereof. In accordance with preferred embodiments, the pipes forming the turbine blades can be arranged in one circular ring or in multiple concentric rings. Additionally, the profile of the outer circumference of the blade-forming pipes, in accordance with one embodiment, is shaped to increase the flow resistance thereof.

9 Claims, 4 Drawing Figures

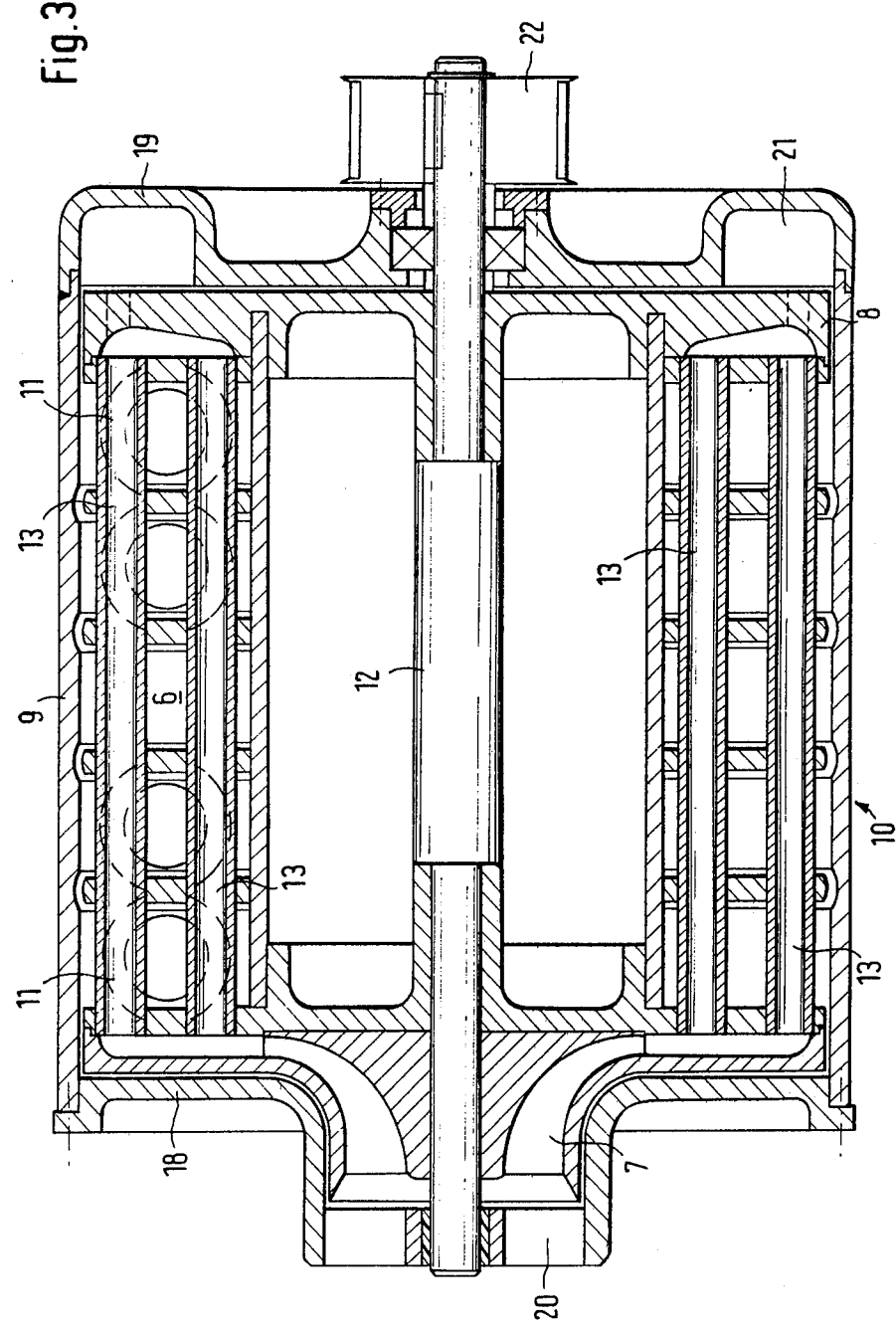

DRIVE UNIT, ESPECIALLY FOR MOTOR VEHICLES

BACKGROUND AND SUMMARY OF THE INVENTION

This invention concerns a drive unit, especially for motor vehicles, of the type that includes an internal combustion engine and a waste-heat turbine unit that has an exhaust-gas turbine which is acted upon by the exhaust gases of the internal combustion engine, wherein the waste-heat turbine unit also utilizes, in addition to the kinetic energy, the thermal energy of the exhaust gases of the internal combustion engine through a superimposed work process in the exhaust-gas turbine, and wherein the waste-heat turbine unit includes a compressor, a secondary turbine and an exhaust-gas turbine, and the turbine blades of the exhaust-gas turbine are formed by hollow blades, through which the operating medium that was compressed by the compressor flows, expanding in the secondary turbine while furnishing power. This type of drive unit is disclosed in applicant's commonly assigned U.S. application Ser. No. 972,211, filed Dec. 22, 1978, now U.S. Pat. No. 4,294,074, which is hereby incorporated by reference.

In the case of the drive unit according to the above-referenced application, the kinetic energy of the exhaust gases is utilized directly by the exhaust-gas turbine, and the thermal energy of the exhaust gas is used indirectly by the exhaust-gas turbine. In this case, the utilization of the kinetic energy of the exhaust gases takes place by the exhaust gases acting upon turbine blades that have a profile having a curved mean camber line. However, it has proved to be a disadvantage that the exhaust gases that are admitted to the exhaust-gas turbine while they are pulsating at a high speed, because of the profile of the turbine blades, at a speed that is only slightly less than the entrance speed, flow out of the exhaust-gas turbine immediately after entering it. Because of this slight change of speed, only a relatively small part of the kinetic energy of the exhaust gases is used in the exhaust-gas turbine.

It is thus the principal object of the present invention to create a drive unit of the initially mentioned type wherein the degree of efficiency of the internal combustion engine is increased by a better utilization of the quantities and types of energy inherent in the exhaust gases in the exhaust-gas turbine.

According to the preferred embodiments of the invention this task is solved by the fact that the turbine blades are formed by pipes that have an at least approximately circular cross section.

In a particularly suitable embodiment of the invention, the turbine blades are formed by pipes with the same circular cross section. The turbine blades may, for example, in an evenly distributed way, be arranged on a circumference, or be evenly distributed on several circumferences of different sizes. The turbine blades of the individual circumferences are arranged so that, in a radial direction, they are at least partially staggered with respect to each other. A further improvement for the utilization of the kinetic energy of the exhaust gases is achieved when the turbine blades, at their outer circumference, have a profile that increases the flow resistance.

Among the principal advantages achieved by means of the invention is the fact that an increase of the degree of efficiency of the internal combustion engine is achieved by a better utilization of the kinetic energy of the exhaust gases in the exhaust-gas turbine, essentially only by means of changing the profile of the turbine blades of the exhaust-gas turbine. By means of these turbine blades, which can be manufactured with few expenditures in regard to functional efficiency, the construction of the exhaust-gas turbine is also simplified. Before exiting the exhaust-gas turbine, the exhaust gases enter into heat exchange with several turbine blades according to the invention, whereby because of the more intensive heat exchange than in the known exhaust-gas turbines, an increase of the efficiency of the internal combustion engine is also achieved due to a better utilization of the thermal energy of the exhaust gases in the exhaust-gas turbine.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 3 shows a cut along the Line III—III of FIG. 2 and

DETAILED DESCRIPTION OF THE PREFERRED EMBODIMENT

Figure 1:
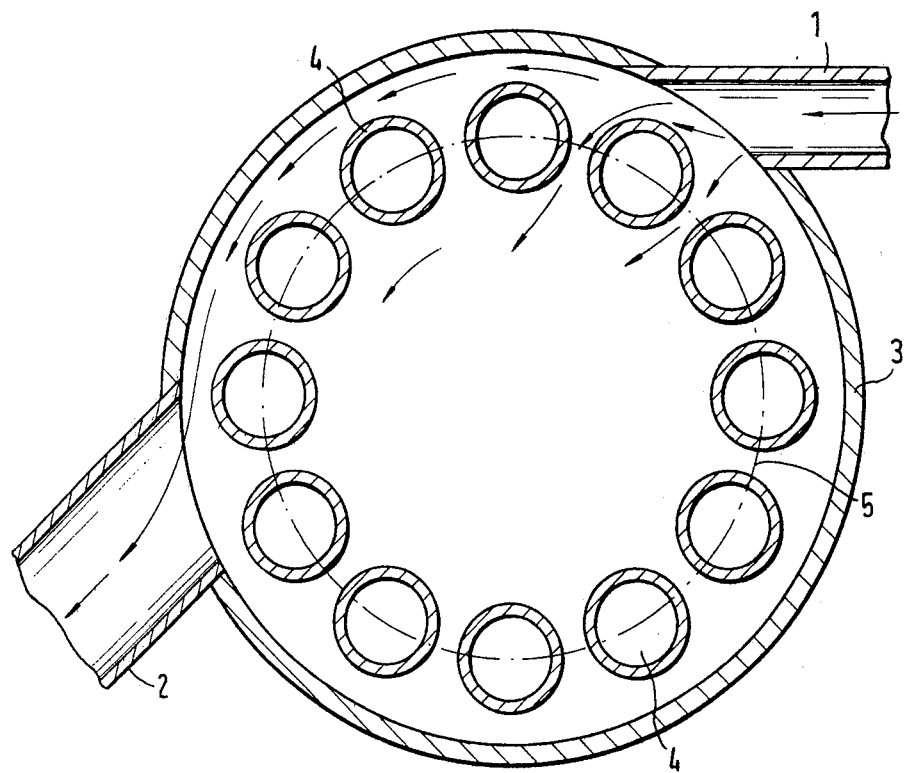
FIG. 1 shows a diagrammatic cross section through an exhaust-gas turbine of a waste-heat turbine unit, where the turbine blades are arranged on a single circumference.

In the diagrammatic cross section of FIG. 1, an exhaust-gas turbine housing with the reference number 3 has an exhaust-gas inlet 1 and an exhaust-gas outlet 2. In the case of this embodiment of the invention, the turbine blades 4 are formed by hollow pipes having the same circular cross section, and are evenly distributed on a circumference 5. The exhaust gases of an internal combustion engine, that is not shown, enter through the exhaust-gas inlet 1 into the exhaust-gas turbine housing 3, flow through the exhaust-gas turbine housing 3, while, at the same time, they act upon the turbine blades, following the flow arrows, and leave the exhaust-gas turbine housing 3 through the exhaust-gas outlet 2.

Figure 2:
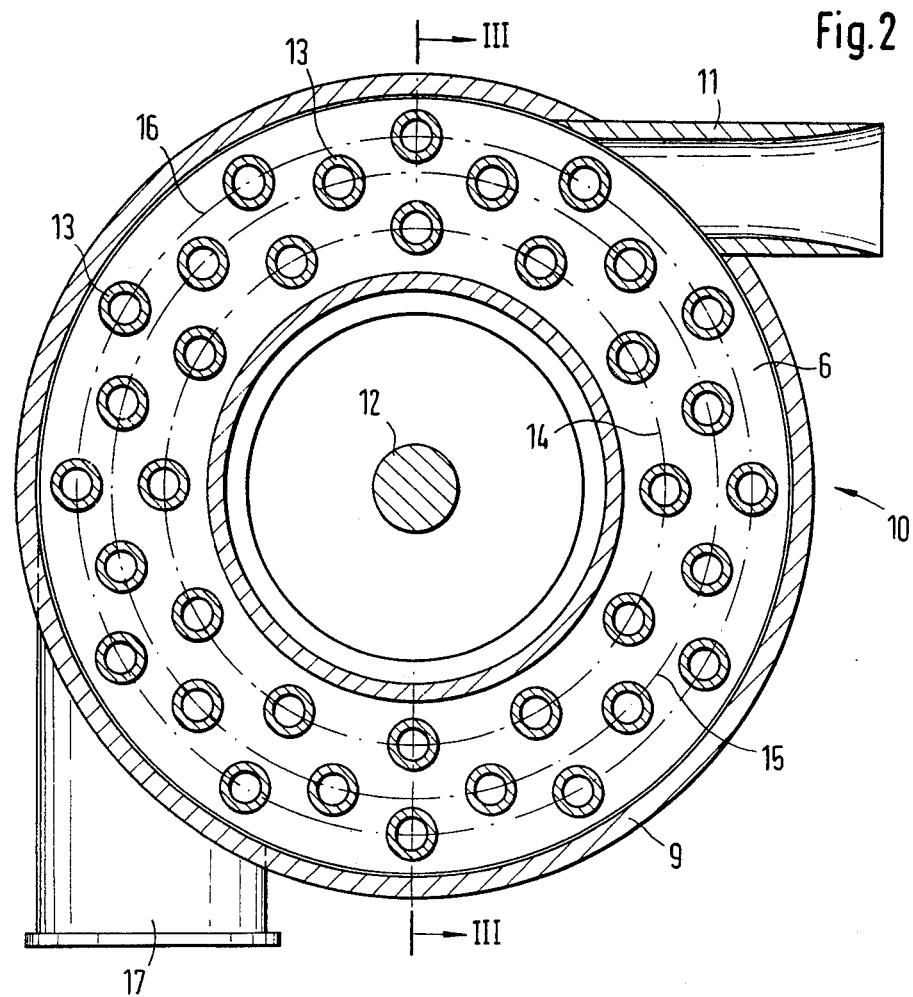
FIG. 2 shows a cross section through a waste-heat turbine unit in the area of an exhaust-gas inlet and an exhaust-gas outlet located behind the inlet, wherein the turbine blades are arranged on several circumferences of different sizes.

The functioning of the invention is described by means of the embodiment shown in FIGS. 2 and 3 which is constructed with the compressor and turbines arranged in an integrated manner.

An exhaust-gas turbine 6, a compressor 7 and a secondary turbine 8 are jointly arranged in a housing 9 and together form a waste-heat turbine unit 10. By means of exhaust-gas inlets 11, the housing 9 is, on the exhaust-gas side, fastened to, e.g., a 4 cylinder internal combustion engine that is not shown. A shaft 12 is rotational mounted in the housing 9, and the exhaust-gas turbine 6, the compressor 7 and the secondary turbine 8 are mounted on shaft 12 so that they rotate therewith. Turbine blades 13 are formed by pipes of the same circular cross section and are evenly distributed on three circumferences 14, 15 and 16 of different sizes. The turbine blades 13 of the individual circumferences are arranged so that they are at least partially staggered with respect to each other in a radial direction. An exhaust-gas outlet that is connected with the housing 9 has the reference number 17. The end walls 18 and 19 of the housing 9 are the bearings for the shaft 12. The front end wall 18 has an opening 20 for the intake of air, and the rear end wall 19 has an opening 21 for the exhaust of air. The power produced by the exhaust-gas turbine 6 and the secondary turbine 8 may be led directly to, for example, the internal combustion engine or may be used for the driving of additional units or of a generator by means of a power take-off 22.

After the start of the internal combustion engine, its exhaust gases, through exhaust-gas inlets 11, are directed to the exhaust-gas turbine 6 in order to drive it. The exhaust-gas turbine 6 drives the compressor 7 so that compressor 7 takes in air and conveys this air, in a compressed manner, through the turbine blades 13 to the secondary turbine 8. While the air flows through the turbine blades 13 that are acted upon by the hot exhaust gases, a heat exchange takes place between the exhaust gases and the air, whereby the compressed air is heated. The air expands in the secondary turbine 8 while furnishing power, whereby the efficiency of the waste-heat turbine unit is increased considerably.

Instead of the operational medium being air, in the thermic process, another substance, for example water, or another vaporizable substance, such as freon, toluene, etc. may also be used. In that case, the compressor 7 is replaced by a pump.

Figure 4:
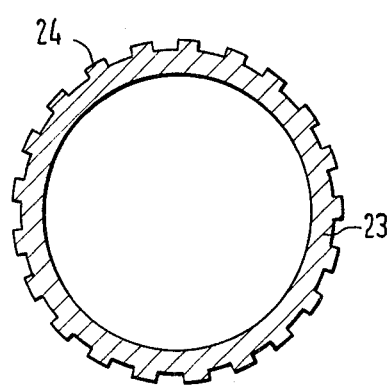
FIG. 4 shows a cross section through a turbine blade which, on its outer circumference has a profile that increases the flow resistance.

In order to further increase the efficiency of the waste-heat turbine unit, turbine blades 23 that, according to FIG. 4, are formed by pipes with a circular cross section, at their outer circumference, may have a profile 24 of arbitrary shape and design that increases the flow resistance. In particular the outer surface of the circular pipe-shaped blades 23 is shown as an axially extending alternating series of almost rectangular ridges and recesses.

In accordance with the invention various modifications to the shown embodiments are contemplated. For example, the pipes that form the turbine blades may have an only approximately circular cross section, and the arrangement of the pipes in the exhaust-gas turbine may take place in any suitable form, i.e. not necessarily arranged on common circumferences.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. In a drive assembly, especially for motor vehicles, of the type comprising an internal combustion engine and an exhaust-gas turbine unit including a compressor, a secondary turbine and an exhaust-gas turbine having hollow blades and driven by the exhaust gases of the internal combustion engine, interconnected with each other, through which an operating medium flows from the compressor to the secondary turbine, means for utilizing both kinetic energy and heat energy of the exhaust gases of the internal combustion engine by a thermal work process superimposed in said exhaust-gas turbine, wherein said means for utilizing comprises hollow blade means fluidically communicating with said compressor and said secondary turbine for passing a working medium compressed by said compressor therethrough to said secondary turbine with said medium being in heat exchange relationship with the exhaust gases while in said hollow blade means and expanding in said secondary turbine and releasing power, the turbine blades being formed by pipes with a substantially circular cross section rigidly connected with said exhaust gas turbine.

2. The drive unit according to claim 1, wherein the turbine blades are formed by pipes with the same cross section.

3. The drive unit according to claim 1, wherein the turbine blades are arranged on a circumference in an evenly distributed manner.

4. The drive unit according to claim 1, wherein the turbine blades are evenly distributed on several circumferences of different sizes.

5. The drive unit according to claim 4, wherein the turbine blades on the respective circumferences are arranged so that they are at least partially staggered with respect to each other in a radial direction.

6. The drive unit according to one of claims 1, 2, 3, 4 or 5, wherein the profile of the outer circumference of the substantially circular pipes is of a shape that increases the flow resistance of the turbine blades.

7. The drive unit according to claim 6, wherein said flow resistance increasing shape is an alternating axially extending series of ridges and grooves.

8. The drive unit according to claim 7, wherein said ridges and grooves are approximately rectangular in transverse cross section.

9. The drive unit according to one of claim 1, 2, 3 or 4, wherein said pipes are circular in transverse cross section.

* * * * *